United States Patent
Ramond et al.

(10) Patent No.: US 8,196,459 B2
(45) Date of Patent: Jun. 12, 2012

(54) SPARK PLUG INCORPORATING A PRESSURE SENSOR

(76) Inventors: Alain Ramond, Merville (FR); Paul Tinwell, Fayence (FR)

( * ) Notice: Subject to any disclaimer, the term of this patent is extended or adjusted under 35 U.S.C. 154(b) by 499 days.

(21) Appl. No.: 12/307,841

(22) PCT Filed: Jun. 28, 2007

(86) PCT No.: PCT/FR2007/001085
§ 371 (c)(1),
(2), (4) Date: Nov. 30, 2009

(87) PCT Pub. No.: WO2008/003846
PCT Pub. Date: Jan. 10, 2008

(65) Prior Publication Data
US 2010/0116039 A1   May 13, 2010

(30) Foreign Application Priority Data
Jul. 7, 2006   (FR) ...................................... 06 06195

(51) Int. Cl.
*G01M 15/08* (2006.01)
(52) U.S. Cl. .................................................... 73/114.19
(58) Field of Classification Search ................. 73/35.12, 73/35.13, 114.19
See application file for complete search history.

(56) References Cited

U.S. PATENT DOCUMENTS

| | | | |
|---|---|---|---|
| 5,479,817 A | 1/1996 | Suzuki et al. | |
| 6,119,667 A * | 9/2000 | Boyer et al. | 123/634 |
| 6,204,594 B1 * | 3/2001 | Ingham | 313/141 |
| 6,756,722 B2 | 6/2004 | Hiramatsu | |
| 6,799,451 B2 * | 10/2004 | Kiess et al. | 73/35.07 |
| 6,923,042 B2 * | 8/2005 | Hiramatsu | 73/35.12 |
| 7,272,970 B2 * | 9/2007 | Ozeki et al. | 73/35.12 |
| 2011/0037372 A1 * | 2/2011 | L'Henoret et al. | 313/141 |
| 2011/0139107 A1 * | 6/2011 | Burrows et al. | 123/169 EL |

FOREIGN PATENT DOCUMENTS

| | | |
|---|---|---|
| EP | 0 609 787 A1 | 8/1994 |
| EP | 0 1 199 551 A2 | 4/2002 |
| JP | 04 012488 A | 1/1992 |

* cited by examiner

*Primary Examiner* — Freddie Kirkland, III
(74) *Attorney, Agent, or Firm* — Robert L. Stearns; Dickinson Wright, PLLC

(57) ABSTRACT

The spark plug comprises: —a central electrode (2), —an insulating core (6) bearing the central electrode (2), —an external body (8) in which the insulating core (6) is mounted and which has a region (18) where the external body (8) is crimped onto the insulating core (6), and—a force sensor (30). The force sensor (30) is mounted at the periphery of the external body (8) between, on the one hand, a bearing element (38) secured to a first peripheral region of the external body (8) and, on the other hand, a second peripheral region (24) of the external body (8). The second peripheral region (24) of the external body (8) is further away from the crimping region (18) than the first peripheral region. The bearing element (38) is prestressed against the force sensor (30).

10 Claims, 1 Drawing Sheet

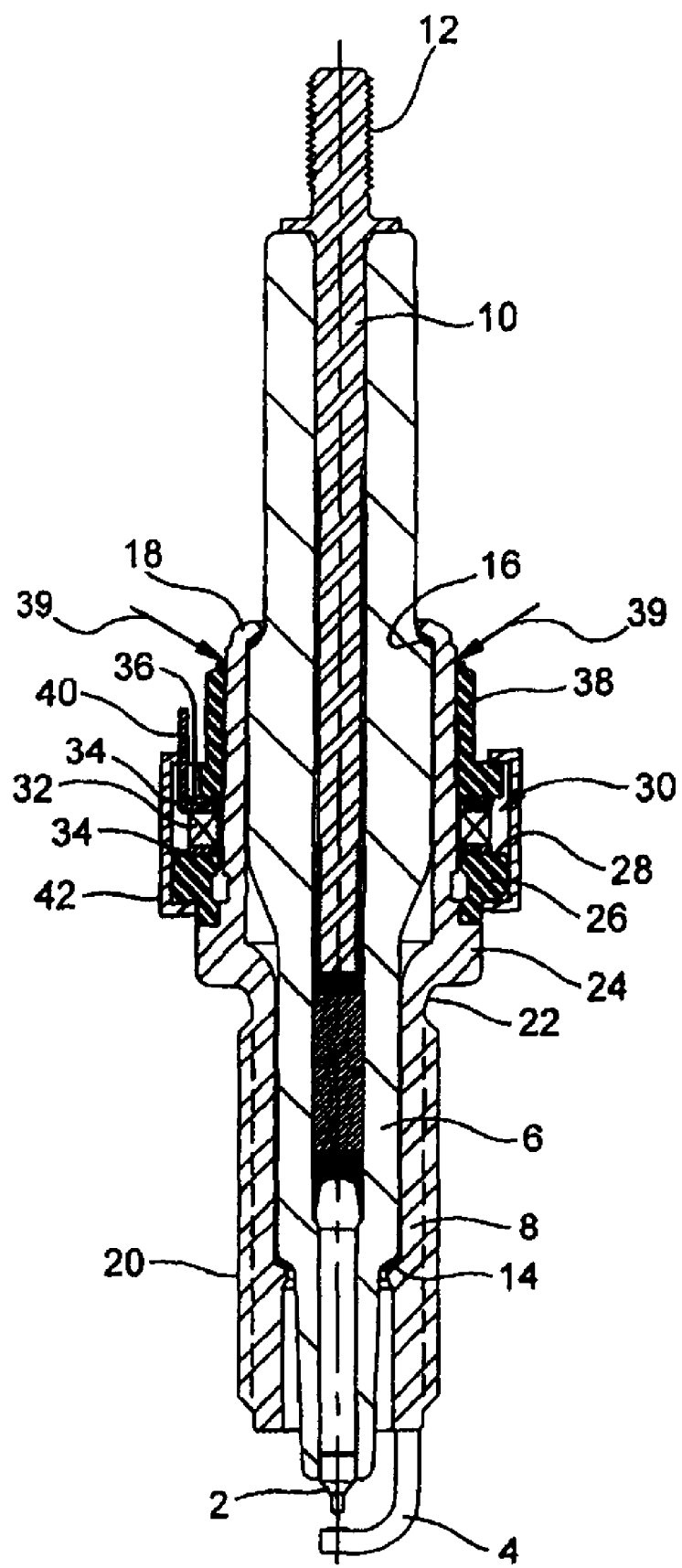

US 8,196,459 B2

SPARK PLUG INCORPORATING A PRESSURE SENSOR

BACKGROUND OF THE INVENTION

1. Technical Field

This invention concerns to a spark plug incorporating a pressure sensor.

2. Related Art

It is important to be aware of the pressure inside the cylinders of an internal combustion engine. By knowing this, it becomes possible to maintain better control of combustion in the engine. This better control in turn makes it possible to limit fuel consumption and also to have an engine that produces fewer pollutants. In gasoline engines, a pressure sensor measuring the existing pressure in the cylinders also makes it possible to avoid the need for a knock detector.

Several solutions of the prior art exist for integrating a sensor in order to enable measurement of the pressure existing in a cylinder of engine gasoline. For example, a pressure sensor may be placed in the cylinder. However, this necessitates modification of the cylinder head to allow the sensor to pass through. Measurement of the pressure existing in a cylinder by measuring the deformation of the cylinder head is also known. This solution also requires that the cylinder head of the engine be adapted and also has the disadvantage of being very difficult to calibrate.

Mounting of a sensor on the plug spark is also known, for example, as shown in U.S. Pat. No. 6,756,722. The disadvantage of the solution suggested in this patent document is that the sensor is obstructed and the assembly proposed is complex. Moreover, the sensor disclosed in this document works on compression.

SUMMARY OF THE INVENTION

The purpose then for this invention is to remedy these various problems. Its purpose is thus to provide a spark plug equipped with a pressure sensor for measuring the pressure inside the corresponding cylinder, the assembly of this sensor being of small overall dimensions and preferably as simple as possible. Also, the sensor will preferably be a traction sensor.

For this purpose, the invention proposes a spark plug which includes:

a central electrode, an insulating core bearing the central electrode, an external body in which the insulating core is mounted and which has a region where the external body is crimped onto the insulating core, and a force sensor.

According to this invention, the force sensor is mounted at the periphery of the external body between, on the one hand, a bearing element secured to a first peripheral region of the external body and, on the other hand, a second peripheral region of the external body; the second peripheral region of the external body is further away from the crimping region than the first peripheral region, and the bearing element is prestressed against the force sensor.

In this way, the pressure within the combustion chamber corresponding to the spark plug claimed is measured in terms of the deformation of the body on the outside of the spark plug. The insulating core exerts a constraint at the level of the crimping region on the external body which is proportional to the pressure existing within the combustion chamber. The spark plug according to the invention allows measurement of the forces exerted on this crimping region.

According to one embodiment of the spark plug according to the invention, (which is an easy embodiment of this spark plug), at the level of the second peripheral region of the spark plug's external body there is an external shoulder against which the surface of the force sensor rests. In this embodiment, an adapter may be placed between the shoulder and the force sensor.

To obtain an excellent connection between the bearing element and the first peripheral region of the external body, the bearing element is advantageously secured to the first peripheral region of the external body by welding.

In order to better measure the stresses on the crimping region, the first peripheral region is preferably within the immediate area of the crimping region or merged with it.

Several types of force sensors may be used. For example, the force sensor used may be a piezoelectric sensor. A piezoresistive sensor could also be used in such an application.

An alternative of a preferred embodiment also includes an outer peripheral cap which protects the force sensor. If an adapter is to be provided between an external shoulder on the external body and the force sensor, the peripheral cap would be mounted for example between the adapter and the bearing element.

One alternative of the embodiment which makes it possible to limit the total longitudinal obstruction due to the presence of the pressure measuring device includes a bearing element with a hexagonal cross-section on the external surface.

This invention also refers to an internal combustion motor, characterized in that it includes at least one spark plug such as that described above.

THE DRAWINGS

The details and advantages of this invention will be more apparent in the description that follows, given hereafter in reference to the attached diagrammatic drawings in which:

The single FIGURE shows a spark plug in a lengthwise view.

DETAILED DESCRIPTION

The elements usually found on a spark plug can be seen on this single FIGURE. The latter includes a central electrode 2 in the traditional fashion, a ground electrode 4, an insulating core 6, and an external body 8, also called at times a spark plug shell.

A spark plug is designed to produce a spark in the combustion chamber of an internal combustion motor. This spark is produced between the two electrodes. The central electrode 2 is mounted on the inside of one end of the insulating core 6. It is fed a high voltage current through a rod 10, which is also mounted on the inside of the insulating core 6 and which crosses the insulating core 6 to open out at the end opposite to the central electrode 2. The end of the rod 10 opposite the central electrode 2 is threaded 12 in order to receive a connecting nut (not shown).

The insulating core 6, which is usually made of a ceramic material, is mounted on the inside of the external body 8. The latter is of a generally cylindrical and circular tube form. One end of the exterior body 8, which will subsequently be called the lower end, carries the ground electrode 4. The latter faces the central electrode 2.

The insulating core 6 is positioned in the external body 8 by a conical cover 14. It is retained within the external body 8 by crimping. The upper end of the external body 8 leans against the shoulder 16 of the insulating core 6 producing in this way the crimping of the insulating core 6 within the external body 8. The crimping region 18 is produced thusly on the upper end of the external body 8 retaining the insulating core 6 imprisoned in the external body 8 and resting on the conical cover 14.

In the usual manner, the external surface on the side of the lower end of the external body 8 is threaded 20. Below this thread, a housing 22 is found which will receive a washer (not shown) also called a plug washer.

Above the housing 22, the external body 8 has a widened region 24 which forms an obstruction when screwing the spark plug into the cylinder head. The upper part of this widened region 24 has a shoulder upon which a support ring 26 is adapted. The lower radial surface of this support ring 26 rests on the widened region 24 of the external body 8. The upper radial surface 28 of this support ring serves as support for a force sensor 30. In the embodiment shown in the drawing, there is one piezoelectric sensor containing a piezoelectric element 32 and two electrodes 34 which are insulated by the insulating washers 36.

The force sensor 30 is prestressed in support by a bearing element constituted by a support ring 38 in the embodiment shown. The latter is shaped to adapt to the form of the upper part of the external body 8. It extends from the force sensor 30 up to the crimping region 18. This support casing 38 is welded to the external body 8. The welded region is shown using arrows 39 in the FIGURE.

The force sensor 30 is thus mounted between the widened region 24 of the external body 8 (through the support ring 26 and the support casing 38. Thus, the support casing 38 is welded close to the crimping region 18, the force sensor 30 measures the stresses between the crimping region 18 and the widened region 24 of the external body 8 of the spark plug.

In the upper area, i.e., opposite the force sensor 30, the support casing 38 has a hexagonal cross-section on the cylindrical external surface. Screwing of the spark plug described into the cylinder head is then carried out on this support casing 38.

The crimping region 18 is pushed upwards when combustion occurs in the corresponding combustion chamber. The widened region 24, found close to the cylinder head and screwed to it, may be assumed as not pushed. Between the widened region 24 and the crimped region 18 of the external body 8, is a flexible and deformable area.

The measurement taken by the force sensor 30 makes it possible, after processing its signal, to know the stresses in this flexible and deformable area. A subsequent calibration then makes it possible to know the pressure inside the corresponding internal combustion engine.

As can be seen in the FIGURE, the electrode 34 has a connecting lead 40 which extends lengthwise to the spark plug. This connecting lead 40 then extends parallel to the support casing 38. A peripheral cap 42 on the force sensor 30 offers protection for the lead from external damage. Preferably, the latter will be made of metal and will make it possible to also shield the force sensor 30 from electrical noise.

This invention offers the advantage of allowing a pressure sensor to be mounted on a traditional type of spark plug while not requiring much modification of the spark plug. The pressure sensor 30 is mounted on the periphery of the external body 8 of the spark plug. Obstruction of this sensor is significantly reduced in terms of radial as well as lengthwise obstruction. Moreover, the number of parts implemented is very limited. The sensor assembly is also easy. In fact, the various elements are stacked around the upper part of the external body 8 of the spark plug. Then a calibrated stress is exerted on the support casing 38 thus putting the force sensor 30 under prestress. Then, the stress is sustained; the support casing 38 is fused.

This type of sensor, mounted in this way, provides a better signal than a pressure sensor mounted between the cylinder head and the spark plug body. In the case of the prior art, the prestress was performed while screwing the spark plug into the cylinder head. On the one hand, it is then difficult to obtain a specific stress on the force sensor and on the other hand to sustain the stress over time.

The invention is not limited to the preferred embodiment described above which serves only as a non-restrictive example. It also concerns variations on the embodiment that will be found within the scope of professionals in the field.

For example, the force sensor used may be a different type of piezoelectric sensor than that described. For example, it may be a piezoresistive sensor, or even another type of force sensor.

The assembly proposed is a preferred assembly.

Thus, for example, the presence of a support ring between the lower surface of the force sensor and the external body of the spark plug is not obligatory.

Although it is preferable to weld the support casing in the immediate vicinity of the crimping region, welding this casing to the external body may also be carried out further away from the crimping region.

What is claimed is:

1. Spark plug including:
   a central electrode,
   an insulating core bearing the central electrode,
   an external body inside which the insulating core is mounted and which has a crimped region of the external body on the insulating core, and
   a force sensor,
   mounted at the periphery of the external body between, on the one hand, a bearing element secured to a first peripheral region of the external body and, on the other hand, a second peripheral region of the external body and wherein,
   the second peripheral region of the external body is further away from the crimping region than the first peripheral region, and
   in that the bearing element is prestressed against the force sensor.

2. Spark plug according to claim 1, wherein the second peripheral region of the external body has an external shoulder against which the surface of the force sensor rests.

3. Spark plug according to claim 2, wherein an adapter is placed between the shoulder and the force sensor.

4. Spark plug according to claim 3, wherein the peripheral cap is mounted between the adapter and the bearing element.

5. Spark plug according to claim 1, wherein the bearing element is attached to the first peripheral region of the external body by welding.

6. Spark plug according to claim 1, wherein the first peripheral region is in the immediate vicinity of the crimping region.

7. Spark plug according to claim 1, wherein the force sensor is a piezoelectric sensor.

8. Spark plug according to claim 1, including an external metal peripheral cap that protects the force sensor.

9. Spark plug according to claim 1, wherein the bearing element has an external hexagonal cross-section surface.

10. Internal combustion motor, having at least one spark plug comprising:
    a central electrode,
    an insulating core bearing the central electrode, an external body inside which the insulating core is mounted and which has a crimped region of the external body on the insulating core, and a force sensor, mounted at the periphery of the external body between, on the one hand, a bearing element secured to a first peripheral region of the external body and, on the other hand, a second peripheral region of the external body and wherein, the second peripheral region of the external body is further away from the crimping region than the first peripheral region, and in that the bearing element is prestressed against the force sensor.

* * * * *